Aug. 30, 1949.                    H. DERMAN                    2,480,323
              SPREADER FASTENER OF THE PAPER-FASTENER TYPE
                          Filed Oct. 11, 1947
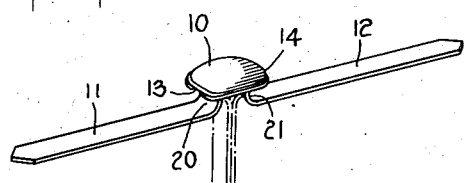
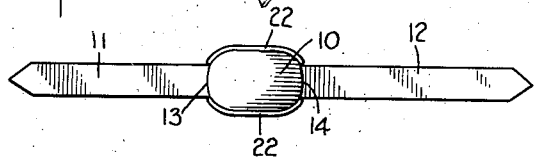
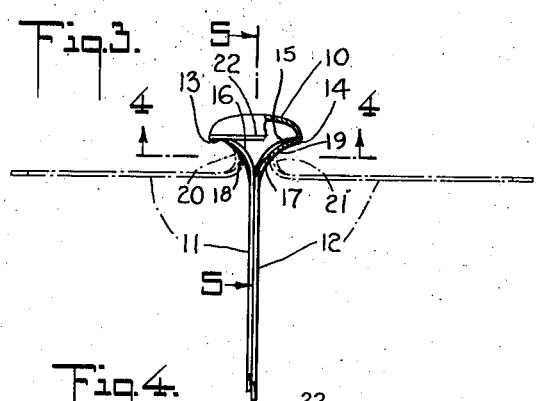
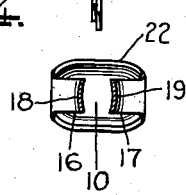
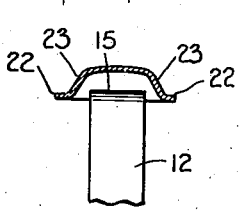
INVENTOR
HARRY DERMAN
BY
ATTORNEY Patented Aug. 30, 1949

2,480,323

UNITED STATES PATENT OFFICE 2,480,323

SPREADER FASTENER OF THE PAPER-FASTENER TYPE

Harry Derman, Great Neck, N. Y.

Application October 11, 1947, Serial No. 779,354

3 Claims. (Cl. 24—153)

This invention relates to fastener devices sometimes termed "paper fasteners" used for joining two or more parts of sheets together. More particularly, the invention deals with spreaders formed from a single strip of material fashioned to form a domed head portion of greater width than the prongs or spreader members of the fastener and terminating in relatively flat side edges beyond the limits of the prongs so as to form a long and relatively wide bearing surface upon a support to which the fastener is attached, preventing the fastener from being displaced from the support.

The novel features of the invention will be best understood from the following description, when taken together with the accompanying drawing, in which certain embodiments of the invention are disclosed and, in which, the separate parts are designated by suitable reference characters in each of the views, and in which:

Fig. 1 is a perspective view showing a spreader made according to my invention with the spreader fingers or prongs in extended position in full lines and in normal contracted position in dot and dash lines.

Fig. 2 is a plan view of the structure, as seen in full lines in Fig. 1.

Fig. 3 is a side view of the structure shown in Figs. 1 and 2, showing the prongs or spreader fingers in collapsed position in full lines and in extended position in dot and dash lines, with parts of the construction shown in section.

Fig. 4 is a section on the line 4—4 of Fig. 3; and

Fig. 5 is a section on the line 5—5 of Fig. 3.

In the drawing, I have shown a fastener which, for sake of this description, will be termed a "spreader" or "spreader fastener" formed from a single strip of material shaped to form a central dome or head portion 10, and spreader fingers or prongs 11 and 12, one of which, mainly the finger 11, being shorter than the finger 12 so as to facilitate separation of the spreaders after passing through a support, as in other devices of this kind.

The arms or fingers 11 and 12 extend integrally from the narrower ends 13 and 14 of the substantially elliptical head 10 and are bent abruptly, as seen at said edges 13 and 14 and then the fingers are curved inwardly slightly, as indicated at 15 in Fig. 5 of the drawing, so as to extend slightly within the dome portion or head 10 and normally the fingers are brought together into abutting relationship to each other, as seen in Fig. 3 of the drawing. The curved portions 16 and 17 of the fingers which extend beyond the incurved parts, as at 15, are curved transversely to a slight extent or bowed outwardly, as seen in the section Fig. 4, at 18 and 19, respectively. These slightly curved or bowed portions give rigidity to the fingers and also form resulting collar portions which will not be injurious to a hole or slit through which the fasteners are passed. In other words, the curved or bowed portions will produce a somewhat rounded contour to the collar portions, as illustrated for example, at 20—21 in Figs. 1 and 3 of the drawing, particularly when the spreader fingers or prongs 11 and 12 are in extended position. It will also be apparent that the inwardly set or curved portions 15 aid in the outward flexure or spreading of the prongs or fingers and prevent transmission of this action to the folded ends 13 and 14 of the head.

In shaping the head or dome 10 of the fastener, the wide side edges are fashioned to form outwardly extended flanges, as at 22, which in conjunction with the turned or folded edges 13 and 14, form a flat bearing surface upon a support to which the fastener is attached and avoid any cutting action into the support, as might otherwise be the case, and further, increase the width or over-all bearing area of the head upon the support so as to prevent the fastener from pulling-out, or being displaced from the support. In doming or rounding the head 10, the walls also extend inwardly to a slight extent, as seen clearly at 23 in Fig. 5 of the drawing, and this construction gives strength to the head and also adapts the head for formation of the other operations, such as characterizing the head to apply a trade-mark or name thereto, or any other symbol of characterization, it simply being a matter of shaping the dies employed to form the head to produce this result.

With my improved one-piece construction, fasteners of the type and kind under consideration can be economically produced, and at the same time, a fastener of practical value is attained, one in which a reasonably large head is provided, and yet, within limits which are not objectionable. The elongated or elliptical contour of the head further adapts the same for characterizing purposes herein mentioned. A strong and durable construction is provided and one which will not be susceptible to breakage, notwithstanding the stresses or strains applied to the fingers or prongs in opening or closing the same.

Having fully described my invention, what I claim as new and desire to secure by Letters Patent is:

1. A fastener device of the character described, said device comprising a single strip of material, the central portion of the strip being domed to form an enlarged elongated head on the fastener, said head having opposed narrow ends, and prongs extending integrally from said opposed ends, said prongs being curved adjacent the head and extending from the central portion of the head in parallel abutting relationship to each other, the curved portions of said prongs extending into the head adjacent end portions on said head, and side wall portions of the head between said prongs terminating in outwardly extending peripheral flanges.

2. A fastener device of the character described, comprising an oblong dome-shaped head and having long sides and narrow ends, and prongs extending integrally from said narrow ends, said prongs being abruptly folded at said ends of the head to extend slightly into the dome of the head, end portions of the prongs being arranged in abutting and alined relationship to each other centrally of the lower surface of the head and depending therefrom, and peripheral edges of the long sides of the head intermediate the prongs having outwardly extending flanges.

3. A spreader fastener comprising a pair of prongs, adjacent ends of the prongs being joined in an integral oblong dome-shaped head of greater width than said prongs, the prongs adjacent the head having curved portions which flare laterally, the ends of the curved portions extending into the head so as to localize flexure of the prongs beyond said ends of the curved portions, and means extending outwardly beyond the dome-shaped head providing wide substantially flat bearing surfaces on the lower sides of the head intermediate said prongs.

HARRY DERMAN.

REFERENCES CITED

The following references are of record in the file of this patent:

UNITED STATES PATENTS

| Number | Name | Date |
|---|---|---|
| 1,383,806 | Haynes | July 5, 1921 |

FOREIGN PATENTS

| Number | Country | Date |
|---|---|---|
| 7,568 | Great Britain | 1907 |
| 563,072 | France | Sept. 19, 1923 |